United States Patent
Condict et al.

(10) Patent No.: US 10,305,732 B2
(45) Date of Patent: May 28, 2019

(54) AUTONOMOUS GENERATION AND TRANSMISSION OF REPORTABLE EVENTS BY FABRIC-ATTACHABLE STORAGE DRIVE

(71) Applicant: Lenovo Enterprise Solutions (Singapore) PTE. LTD., New Tech Park (SG)

(72) Inventors: Michael Neil Condict, Hurdle Mills, NC (US); David W. Cosby, Raleigh, NC (US); Jonathan Randall Hinkle, Morrisville, NC (US); Theodore Brian Vojnovich, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 241 days.

(21) Appl. No.: 15/406,299

(22) Filed: Jan. 13, 2017

(65) Prior Publication Data
US 2018/0205603 A1 Jul. 19, 2018

(51) Int. Cl.
*H04L 12/24* (2006.01)
*H04L 12/26* (2006.01)
(Continued)

(52) U.S. Cl.
CPC ...... *H04L 41/0806* (2013.01); *H04L 41/0681* (2013.01); *H04L 43/06* (2013.01);
(Continued)

(58) Field of Classification Search
USPC ........................................................ 709/222
See application file for complete search history.

(56) References Cited

U.S. PATENT DOCUMENTS 6,151,659 A 11/2000 Solomon et al.
6,889,309 B1 5/2005 Oliveira et al.
(Continued)

OTHER PUBLICATIONS

US 10,019,328 B1, 07/2018, Condict et al. (withdrawn)
(Continued)

*Primary Examiner* — Umar Cheema
*Assistant Examiner* — John Fan
(74) *Attorney, Agent, or Firm* — Jason Friday

(57) ABSTRACT

A fabric-attachable storage drive self-monitors a prespecified parameter. Responsive to detecting satisfaction of a prespecified condition, the storage drive autonomously generates a reportable event regarding the self-monitored prespecified parameter, and autonomously transmits the reportable event to a prespecified location on a network fabric to which the drive is connected. The storage drive can interact with other fabric-attachable storage drives to create a logical volume according to a specified logical data storage topology on a self-organized storage device group in a peer-to-peer manner. The storage drive can be a programmable non-volatile memory Express (NVMe) storage drive exporting access thereto over an NVMe-over-fabric storage protocol, or a programmable storage drive lacking an external interface by which to connect to a host computing device storage device but that has a network interface connected to a network fabric.

15 Claims, 5 Drawing Sheets

(51) Int. Cl.
  *H04L 29/08* (2006.01)
  *H04L 12/931* (2013.01)
(52) U.S. Cl.
  CPC ........ *H04L 49/356* (2013.01); *H04L 67/1097* (2013.01); *H04L 41/0893* (2013.01); *H04L 43/0894* (2013.01); *H04L 43/16* (2013.01)

(56) References Cited

U.S. PATENT DOCUMENTS

| | | | |
|---|---|---|---|
| 7,251,709 B2* | 7/2007 | Williams | G06F 3/061 710/22 |
| 7,702,906 B1 | 4/2010 | Karr et al. | |
| 9,448,735 B1 | 9/2016 | Proulx et al. | |
| 9,727,379 B1 | 8/2017 | Wilkes et al. | |
| 9,983,807 B1 | 5/2018 | Tylik et al. | |
| 10,031,857 B2* | 7/2018 | Menachem | G06F 13/28 |
| 10,042,721 B2 | 8/2018 | Condict et al. | |
| 2001/0019614 A1 | 9/2001 | Madoukh | |
| 2005/0193128 A1 | 9/2005 | Dawson et al. | |
| 2006/0059253 A1* | 3/2006 | Goodman | G06Q 10/06 709/223 |
| 2006/0282636 A1 | 12/2006 | Yamamoto et al. | |
| 2007/0206224 A1 | 9/2007 | Nagashima et al. | |
| 2011/0022812 A1* | 1/2011 | van der Linden | G06F 9/5077 711/163 |
| 2012/0102268 A1* | 4/2012 | Smith | G06F 11/2089 711/113 |
| 2012/0233463 A1 | 9/2012 | Holt et al. | |
| 2013/0067187 A1 | 3/2013 | Moss et al. | |
| 2013/0297907 A1* | 11/2013 | Ki | G06F 12/0684 711/170 |
| 2015/0149625 A1* | 5/2015 | Piro, Jr. | H04L 43/0858 709/224 |
| 2015/0288783 A1 | 10/2015 | Ma et al. | |
| 2016/0004475 A1 | 1/2016 | Beniyama et al. | |
| 2018/0107409 A1 | 4/2018 | Condict et al. | |
| 2018/0143776 A1 | 5/2018 | Caporale et al. | |
| 2018/0150244 A1 | 5/2018 | Caporale et al. | |
| 2018/0260123 A1 | 9/2018 | Andresen et al. | |

OTHER PUBLICATIONS

Brown, K., "Fabric Attached Storage: The Convergence of NAS & SAN", Comnet Washington DC., Jan. 28, 2002, 15 pp.
Cooke, A., "An Introduction to Scale-Up vs. Scale-Out Storage", Enterprise Storage Guide, online <http://www.enterprisestorageguide.com/introduction-scale-vs-scale-storage>, Mar. 6, 2014, 5 pp.
Wilmsen, M., "Hyper converged vs. traditional SAN/NAS?", Virtual Hike, online <http://virtual-hike.com/hyper-converged-or-a-traditional-sannas/>, Jun. 4, 2015, 2 pp.
Crowley, P. "Programmable Peripheral Devices," http://www.cs.wustl.edu/~pcrowley/papers/generals.pdf, dated no later than May 14, 2014.
"Hot spare", Wikipedia.com, <https://en.wikipedia.org/wiki/Hot_spare>, last edited Nov. 13, 2015, accessed Jan. 11, 2016, 2 pp.
Rashmi, K.V. et al., "A "Hitchhiker's" Guide to Fast and Efficient Data Reconstruction in Erasure-coded Data Centers", SIGCOMM'14, Aug. 17-22, 2014, Chicago, USA, 12 pp.
Khasymski, A. et al., "Realizing Accelerated Cost-Effective Distributed RAID", Handbook on Data Centers. Springer New York, 2015. 24 pp.
Yu Hu, Xiao et al., "Efficient Implementations of the Sum-Product Algorithm for Decoding LDPC Codes", IBM Research, Zurich Research Laboratory, CH-8803 Ruschlikon, Switzerland, IEEE 2001, 6 pp.
Bryant, C., "HGST Demos Ethernet as a Storage Drive Interface", tom's IT PRO, online <http://www.tomsitpro.com/articles/hgst-10gbps-ethernet-cloud-stor . . . >, 4 pp.
Swartz, K.L., "3PAR Fast RAID: High Performance Without Compromise", 2010, 3PAR Inc., 11 pp.
"Introduction to Toshiba Key Value Drive Technology", Toshiba Corporation, May 2015, 13 pp.
"Storage Monitoring for HDDs and RAID Controllers", Oracle Storage Monitoring and Zone Management, online (https://docs.oracle.com/cd/E19201-01/820-6410-12/ilom_storagemonitor . . . >, copyright 2010, accessed Jan. 11, 2016, 9 pp.
Armstrong, A., "Toshiba Announces Key Value-Based Technology for Object Storage", online <http://www.storagereview.com/toshiba_announces_key_valuebase . . . >, May 18, 2015, 2 pp.
"Whitepaper, Key Value Drive", Toshiba Corporation, May 2015, 10 pp.
U.S. Appl. No. 15/295,596, filed Oct. 17, 2016, 68 pp.
U.S. Appl. No. 15/357,267, filed Nov. 21, 2016, 69 pp.
U.S. Appl. No. 15/084,908, filed Mar. 30, 2016, 63 pp.
U.S. Appl. No. 15/365,333, filed Nov. 30, 2016, 68 pp.
U.S. Appl. No. 15/084,908, filed Mar. 7, 2017, 65 pp.
US 10,254,984, 04/2019, Caporale et al. (withdrawn).

* cited by examiner

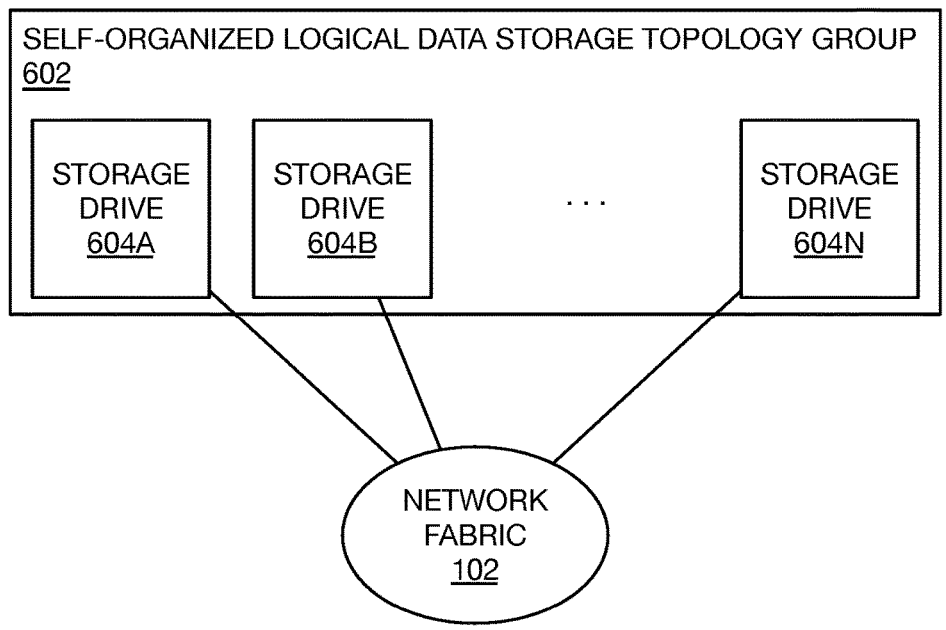
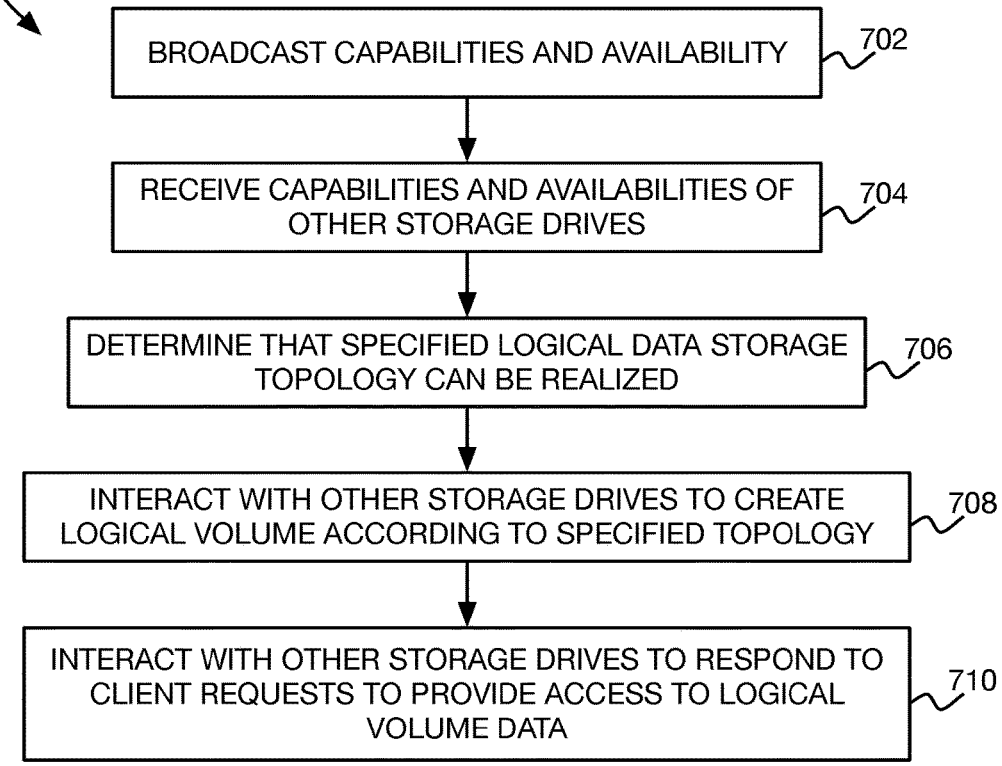

AUTONOMOUS GENERATION AND TRANSMISSION OF REPORTABLE EVENTS BY FABRIC-ATTACHABLE STORAGE DRIVE

BACKGROUND

Storage drives, such as magnetic hard disk drives and solid-state drives (SSDs), are used to store data within computing systems. A conventional storage drive includes a physical non-volatile storage, such as rotatable magnetic platters or solid-state semiconductor memory, on which the drive stores data. The physical storage is disposed within an enclosure of a prespecified form factor, such as a 3½-inch form factor. Data on the physical storage is accessible through a bus interface, such as a serial AT attachment (SATA) bus interface, which connects the storage drive to a host computing device, or potentially along with other such storage drives to a storage enclosure translating the bus interface to another type of interface, such as a universal serial bus (USB) interface, to which a host computing device can connect. The storage enclosure may have sufficient processing capability to provide higher-level storage functionality, like redundant array of independent disks (RAID) functionality, in relation to the storage drives connected to the enclosure.

SUMMARY

An example method includes connecting a fabric-attachable storage drive to a network fabric. The method includes programming the fabric-attachable storage drive to self-monitor a parameter of the fabric-attachable storage drive. The method includes programming the fabric-attachable storage drive to autonomously generate a reportable event regarding the self-monitored parameter responsive to a condition occurring. The method includes programming the fabric-attachable storage drive to autonomously transmit the autonomously generated reportable event to a specified location on the network fabric. The method includes architecting the fabric-attachable storage drive to start self-monitoring of the parameter as programmed. The fabric-attachable storage drive autonomously generates the reportable event after the condition occurs and autonomously transmits the reportable event over the network fabric to the specified location after the reportable event is autonomously generated.

An example fabric-attachable storage drive includes a network fabric adapter to physically connect the fabric-attachable storage drive to a network fabric. The fabric-attachable storage drive includes a non-volatile storage to store data accessible over the network fabric, and control hardware to run an operating system. The control hardware is to run the operating system to self-monitor a prespecified parameter of the fabric-attachable storage drive, and to detect satisfaction of a prescribed condition. The control hardware is to run the operating system to, responsive to detecting satisfaction of the prespecified condition, autonomously generate a reportable event regarding the self-monitored prespecified parameter, and autonomously transmit the reportable event to a prespecified location on the network fabric.

An example computer-readable data storage medium that is not a transitory signal stores computer-executable code that a fabric-attachable storage drive executes. The fabric-attachable storage drive executes the code to broadcast capabilities and availability of the fabric-attachable storage drive over a network fabric to which the fabric-attachable storage drive is connected. The fabric-attachable storage drive executes the code to receive capabilities and availabilities of other fabric-attachable storage drives broadcast over the network fabric. The fabric-attachable storage drive executes the code to, in response to determining that the capabilities of one or more selected fabric-attachable storage drives that are available are sufficient to create a logical volume thereover according to a specified logical data storage topology, interact with the selected fabric-attachable storage drives. The fabric-attachable storage drive executes the code to interact with the selected fabric-attachable storage drives to create the logical volume according to the specified logical data storage topology on a storage device group including the fabric-attachable storage drive and the selected fabric-attachable storage drives. The logical volume lacks a central management controller, and the storage drive group self-organizes in a peer-to-peer manner to create the logical volume.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a diagram of an example group of fabric-attachable storage drives that have autonomously self-organized to provide a logical data storage topology.

FIG. 7 is a flowchart of an example method by which a fabric-attachable storage drive self-organizes with other storage drives to provide a logical data storage topology, in a peer-to-peer manner.

DETAILED DESCRIPTION

Figure 1:
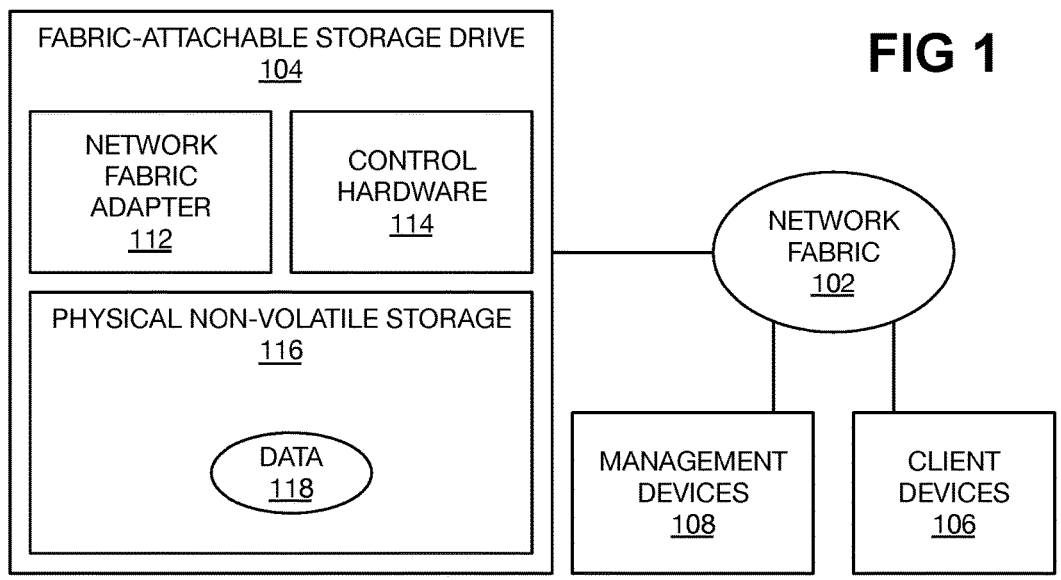
FIG. 1 is a diagram of an example network fabric system including a fabric-attachable storage drive.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a conventional storage drive includes a physical non-volatile storage residing within an enclosure, where access to the data stored on the storage is accessible over a bus interface. Such conventional storage drives include limited controller hardware that simply manage low-level access to the enclosed physical storage media. That is, a conventional storage drive is typically a "dumb" drive, without any processing capability other than an internal read/write controller to manage low-level access to the data stored on the physical storage of the drive. Higher-level functionality, such as redundant array of independent disks (RAID) functionality, is managed by a host computing device to which the storage drives are directly connected, or by a storage enclosure to which the drives are directly connected and that itself is communicatively connected to a host computing device.

Monitoring of a conventional storage drive is performed at the initiation of the host computing device or storage enclosure to which the drive is directly connected. Periodically the host computing device or storage enclosure polls a storage drive to retrieve parameters that the device or enclosure is monitoring, such as environmental parameters like operating temperature. Even the limited physical parameters that a conventional storage drive can itself monitor, such as unreadable physical storage sectors and low-level read and write errors that the drive may monitor in accordance with the self-monitoring, analysis, and reporting technology (S.M.A.R.T.), are not autonomously reported by the drive to its connected host device or enclosure. Rather, the host computing device or storage enclosure must "pull" this information at periodic intervals from the drive as desired. Other parameters, such as those concerning performance like interface data transfer rate and capacity, are also not autonomously reported by a storage drive but rather are maintained by the host device or enclosure.

Relatively new types of storage drives include two types of fabric-attachable storage drives. One such type of storage drive is a programmable storage drive, such as an Ethernet-attached programmable storage drive. A programmable storage drive can lack a serial AT attachment (SATA) interface or other type of interface that is commonly found in a conventional, or "dumb" storage drive to interface with the bus of a host computing device or storage enclosure. Rather, such a programmable storage drive may just include a network interface by which to connect to a network fabric. A programmable storage drive generally includes a processor and a limited amount of memory, permitting the drive to have an operating system, such as a version of the LINUX operating system, installed thereon and run relatively small-scale applications.

A programmable storage drive differs from a network-attached storage (NAS) device, even such a NAS device that includes just one storage drive. A NAS device generally has a more capable processor and more memory than a programmable storage drive, and usually is able to run a variety of larger-scale applications, including providing a graphical user interface (GUI) by which the NAS device can be managed. While a NAS device is conceptually similar to a programmable disk drive, they are sufficiently different that they are not usually interchangeable, and those of ordinary skill within the art would not typically deploy one instead of the other for a particular usage scenario.

Another relatively new type of storage drive is a type of non-volatile memory Express (NVMe) storage drive that is attachable to a fabric. An NVMe storage drive is also programmable, albeit potentially less so than a programmable storage drive due to its commonly having a discrete hardware controller as opposed to a separate processor and memory. Nevertheless, an NVMe storage drive may still be able to run a limited operating system. The NVMe storage drive exports access to its physical storage via an NVMe over fabric network protocol. This protocol provides support for allocation and deallocation of namespaces, for instance.

Such new types of storage drives permit development of new types of data storage architectures. For example, a number of programmable storage drives may be assembled into a peer-to-peer RAID that lacks a central RAID controller as is conventional. Such a technique is described in the patent application previously filed on Mar. 30, 2016, and assigned application Ser. No. 15/084,908. As another example, a number of fabric-attachable storage drives can be part of a distributed storage-area network (SAN), in which a SAN manager solely manages the storage drives and does not govern access to data stored on the drives, which is instead directly accessed by client computing devices running SAN agents. Such a technique is described in the patent application previously filed on Oct. 17, 2016, and assigned application Ser. No. 15/295,596.

The increasing intelligence and thus operational independence of storage drives means that their underlying operation has become separated from any external manager or controller, rendering monitoring more difficult. That is, conventional storage drives that are directly connected in limited numbers to a common host computing device or storage enclosure are easily monitored by the host device or enclosure periodically polling the drives. Furthermore, insofar as the host computing device or storage enclosure directly governs all access to data stored on storage drives connected directly to the host device or enclosure, the host device or enclosure can easily monitor performance characteristics of the drives due to this operational closeness.

By comparison, since newer, fabric-attachable storage drives operate more independently, this lack of operational proximity to devices accessing data on the drives prevents the devices from easily monitoring them. A separate management device may instead be responsible for monitoring a much larger number of such storage drives. The polling paradigm by which monitoring information is pulled from storage drives, though, does not scale well. A management device, such as a management computing device or SAN manager, can easily become overwhelmed by having to poll a large number of storage drives at a sufficient frequency to proactively manage the drives and provide early detect of issues that may harbinger future problems. Furthermore, ongoing performance characteristics of the drives are not readily ascertained, since the management device or manager does not directly govern access to data on the drives.

Disclosed herein are techniques to ameliorate the shortcomings associated with current storage drive monitoring techniques in relation to fabric-attachable storage drives like NVMe storage drives and programmable storage drives. Such a fabric attachable storage drive is programmed to self-monitor a parameter thereof, and is programmed to autonomously generate a reportable event regarding the self-monitored parameter responsive to a condition occurring. The drive is further programmed to autonomously transmit the autonomously generated reportable event to a specified location on a network fabric to which the drive is connected.

Therefore, when the fabric-attachable storage drive is deployed, the drive self-monitors this parameter, automatically generating a reportable event regarding the parameter and autonomously transmitting the generated reportable event to the specified location on the fabric when the condition occurs. The condition may be an interval timer reaching a prescribed interval, such that the storage drive automatically generates and reports the reportable event regarding the parameter symmetrically at occurrences of this regular interval. The condition may be the parameter satisfying a threshold, such as the parameter exceeding or being lower than a threshold maximum or minimum, respectively. In this case, the storage drive again automatically generates and reports the reportable event, but just asymmetrically each time the threshold is satisfied, as opposed to at regular intervals.

The techniques described herein thus permit fabric-attachable storage drives to "push" monitoring information to, for instance, management devices, instead of requiring the management device to pull this information from the drives via polling. As such, a given management device is more likely to be able to manage a larger number of storage drives on a fabric without creating unnecessary network traffic on the fabric. The techniques described herein permit monitoring of storage drives even though the management devices lack operational proximity to the drives in terms of directly governing access to data stored on the drives, so that the management devices can still readily monitor ongoing performance characteristics of the drives.

FIG. 1 shows an example network fabric system 100. The system includes a network fabric 102. The fabric 102 can be a fibre channel fabric, a fibre channel over Ethernet (FCoE) fabric, an Internet small computer system interface (iSCSI) fabric, a serial attached SCSI (SAS) fabric, an InfiniBand fabric, a non-volatile memory Express (NVMe) over Ethernet or fibre channel fabric, or another type of fabric, including just an Ethernet network. The fabric 102 may be a storage-area network (SAN) fabric, in which case the system 100 is a SAN system 100, such as a distributed SAN system.

A fabric-attachable storage drive 104 is directly connected to and directly addressable on the fabric 102. Just one storage drive 104 is depicted in FIG. 1 for illustrative clarity and convenience, but there can be more than one storage drive 104, which may operate independently of one another, or in conjunction with one another to provide central controller-less higher-level storage functionality, such as RAID and other types of higher-level storage functionality. Client computing devices 106 are also directly connected to the network fabric 102, as are one or more management computing devices 108.

The client computing devices 106 interact with the fabric-attachable storage drive 104 to access data stored on the storage drive 104, whereas the management computing devices 108 interact with the storage drive 104 to manage the drive 104. The client devices 106 can be server computing devices or systems, and are considered client computing devices in that within the system 100, they are clients of the (host) storage drive 104 that store data for the client devices 106. The management devices 108 are also nodes on the system 100 but, however, do not effect data transfer between the client devices 106, and in this respect differ from conventional storage controllers that both govern data access and perform management functions of storage drives.

The client devices 106 can be separate from the management devices 108. For example, the client devices 106 may not manage the storage drive 104 but just use the drive 104 for data storage purposes, and similarly the management devices 108 may manage the storage drive 104 but not use the drive 104 for data storage purposes. In another implementation, one or more of the client devices 106 may also manage the storage drive 104 and therefore be management devices 108. For example, management functionality may be implemented in software that one or more of the client devices 106 run, such that these client devices 106 are also management devices 108. One or more of the management devices 108 may also use the storage drive 104 for data storage purposes, such as to store management information regarding the drive 104, and thus be considered client devices 106 as well in this respect.

The fabric-attachable storage drive 104 includes a network fabric adapter 112, which is the hardware that permits the storage drive 104 to directly connect to the network fabric 102. The storage drive 104 includes control hardware 114, different implementations of which are described later in the detailed description. The storage drive 104 includes a physical non-volatile storage 116, which can be magnetic like one or more hard disk drive platters, or a semiconductor memory like a number of semiconductor integrated circuits (ICs) of the type found in a solid-state drive (SSD). The physical storage 116, however, is not a complete hard disk drive or SSD in and of itself. The physical storage 116 stores data 118 that is accessible by the client devices 106, and which may be stored in the form of one or more logical volumes created under the management of the management devices 108.

Figure 2A:
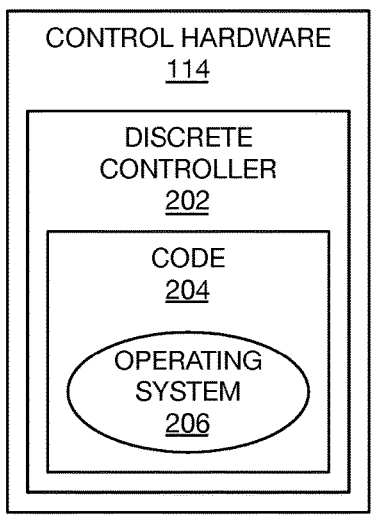
FIGS. 2A and 2B are diagrams of example control hardware of a fabric-attachable storage drive.
Figure 2B:
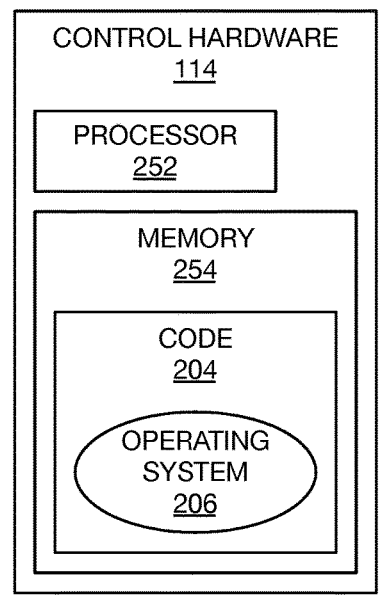

FIGS. 2A and 2B show example control hardware 114 of the fabric-attachable storage drive 104 of FIG. 1. In FIG. 2A, the example control hardware 114 may pertain to a storage drive 104 that is an NVMe storage drive that is programmable. The control hardware 114 can include a discrete hardware controller 202, in the form of an application-specific IC (ASIC), or a field-programmable gate array (FPGA), for instance. The discrete controller 202 exports access to the storage drive 104 via the NVMe over fabrics network protocol, which provides support for allocation and deallocation of namespaces. The discrete controller 202 is sufficiently powerful to execute computer-executable code 204 thereof, including a limited operating system 206, such as a limited functionality version of the LINUX operating system.

In FIG. 2B, the example control hardware 114 may pertain to a fabric-attachable storage drive 104 that is an Ethernet-attached programmable storage drive. As noted above, a programmable storage drive can be one that lacks a SATA interface or other type of interface that is commonly found in "dumb" disk drives to interface with a bus of a host computing device. The control hardware 114 can include a discrete general-purpose processor 252, such as a reduced instruction set computer (RISC) processor or a complex instruct set computer (CISC) processor, and discrete semiconductor memory 254 separate from the processor 252. The memory 254 stores the computer-executable code 204 including the limited operating system 206, which the processor 252 executes.

Figure 3:
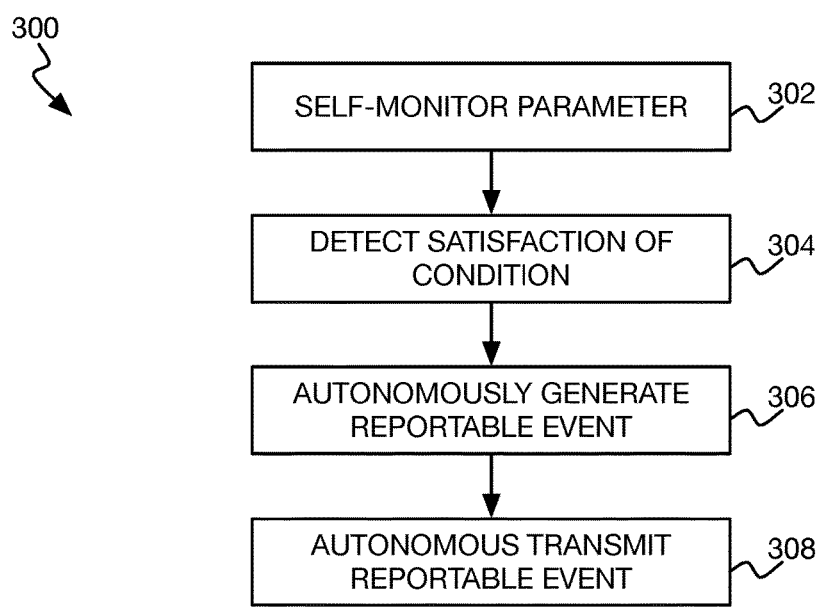
FIG. 3 is a flowchart of an example method for autonomous transmission and autonomous generation of a reportable event by a fabric-attachable storage drive.

FIG. 3 shows an example method 300 that the fabric-attachable storage drive 104 performs. For instance, the operating system 206 of the storage drive 104 can be programmed to perform the method 300. As another example, other computer-executable code, such as an application computer program, a service, or a daemon, which is a different part of the computer-executable code 204 and which runs on or in conjunction the operating system 206, can be programmed to perform the method 300. The control hardware 114 of the storage device 104 thus performs the method 300.

The fabric-attachable storage drive 104 self-monitors a prescribed or specified parameter of the storage drive 104 (302). Self-monitoring means that the storage drive 104 directly monitors this parameter itself, as opposed to other, external devices, such as the management devices 108, directly monitoring the parameter. In general, there may be two types of parameters that the storage drive 104 self-monitors: environmental parameters, and performance parameters.

Environmental parameters are measured by sensors of the fabric-attachable storage drive 104, and concern the operating environment in which storage drive 104 is operating. An example of an environmental parameter is the current temperature of the storage drive 104, which is influenced by both the ambient temperature of the outside environment in which the drive 104 is situated, as well as any heat internally generated by operation of the drive 104. Another example of an environmental parameter is humidity. Environmental parameters can indicate that the storage drive 104 is located in an outside environment that is deleterious to the continuing operation of the drive 104, and/or that the storage drive 104 is malfunctioning. For example, if the storage drive 104 is situated in a location that has a too high ambient temperature, the drive 104 may not be able to operate continuously for long periods of time. As another example, if the temperature of the storage drive 104 begins to increase suddenly without a corresponding increase in ambient temperature, a component of the drive 104 may be failing.

Performance parameters are maintained by the fabric-attachable storage drive 104 as the storage drive 104 operates, and can concern external performance, internal performance, as well as other usage of the drive 104. One external performance parameter is the external data transfer rate at which the storage drive 104 is responding to access requests regarding the data stored on its physical storage 116 over the network fabric 102 via the network fabric adapter 112. This data transfer rate, and thus performance parameter, is external in that the rate reflects how quickly the storage drive 104 can transfer date over the network fabric 102. An unduly slow transfer rate can denote that the network fabric adapter 112 is not functioning properly, that the network fabric 102 is congested, and so on.

A corresponding internal performance parameter is the internal data transfer rate at which the fabric-attachable storage drive 104 is internally accessing data stored on its physical storage 116. This data transfer rate can differ from the external data transfer rate. For instance, the storage drive 104 may be able to quickly access data stored on the physical storage 116, but may be unable to quickly transmit the data onto the network fabric 102, and instead have to cache the data accessed from the storage 116 until the data is able to be transmitted onto the fabric 102 via the network fabric adapter 112. The internal data transfer rate may in conjunction with the external data transfer rate indicate a problem with the physical storage 116. If, for example, the external data transfer rate and both the internal data transfer rate are unduly low, and if there are no issues with congestion on the network fabric 102, then the reason why the transfer rates are so slow may be because the physical storage 116 is beginning to fail.

Another example of an external performance parameter is the total number of access requests that the fabric-attachable storage drive 104 has received regarding the data stored on its physical storage 116. Performance parameters regarding the capacity of the storage drive 104 can include a capacity usage parameter regarding an available or used capacity of the drive 104. The performance parameters are maintainable by the storage drive 104 if programmed to do so, because the parameters concern the drive 104 itself. Because there is no external central storage controller through which data accesses to the storage drive 104 are made, unlike a conventional storage enclosure having "dumb" storage drives, a management device like one of the management devices 108 is not normally privy to this information, and cannot easily ascertain this information like the drive 104 itself can.

The fabric-attachable storage drive 104 detects satisfaction of a prescribed or specified condition (304), examples of which are described later in the detailed description. In response to satisfaction of the condition occurring, the storage drive 104 autonomously generates a reportable event (306), and autonomously transmits the event to a prespecified location on the network fabric 102 (308), such as the network address of each of one or more of the management devices 108. The generation and transmission of the reportable event are autonomous in that the storage drive 104 automatically generates and transmits the event without first receiving a request to do so by, for instance, one of the management devices 108. In this respect, autonomous generation and transmission of the reportable event is in contradistinction to such generation and transmission that may occur responsive to polling of the storage drive 104 by one of the management devices 108. In a polling paradigm, the storage drive 104 does not self-monitor parameters and automatically generate and transmit reportable events responsive to conditions occurring, but rather generates and transmits information responsive to receiving a polling request.

A reportable event is an event in that it is responsive to a condition occurring. A reportable event is reportable in that it reports information, such as the value of a parameter. A reportable event can take a different form depending on how the fabric-attachable storage drive 104 has been programmed to generate and transmit the event. For example, a reportable event can have a prespecified format, identifying the time at which the value of the parameter was retrieved or read, the identity of the parameter in question, and the value of the parameter. Different management devices 108 can receive different reportable events in different formats. The same reportable event may be sent to more than one location on the network fabric 102 at the same time in part 308. A reportable event may include the values of multiple parameters, and different reportable events may be autonomously generated and transmitted to the same or different locations on the network fabric 102 responsive to satisfaction of different conditions being detected.

Therefore, the approach described in relation to FIG. 3 provides for robust flexibility in fulfilling the information requirements of diverse management devices 108 as they pertain to the fabric-attachable storage drive 104. The storage drive 104 can be programmed to meet the needs of each management device 108 for information regarding the parameters of the drive 104. Some management devices 108 may be concerned with just the performance parameters of the storage drive 104, so that the devices 108 can make informed decisions on whether a logical volume should be instantiated using the drive 104 responsive to a corresponding request from one of the client computing devices 106. Other management devices 108 may be concerned with just the environmental parameters of the storage drive 104, to ascertain whether the drive 104 is potentially failing and therefore to initiate failover to another fabric-attachable storage drive before such failure actually occurs.

Figure 4A:
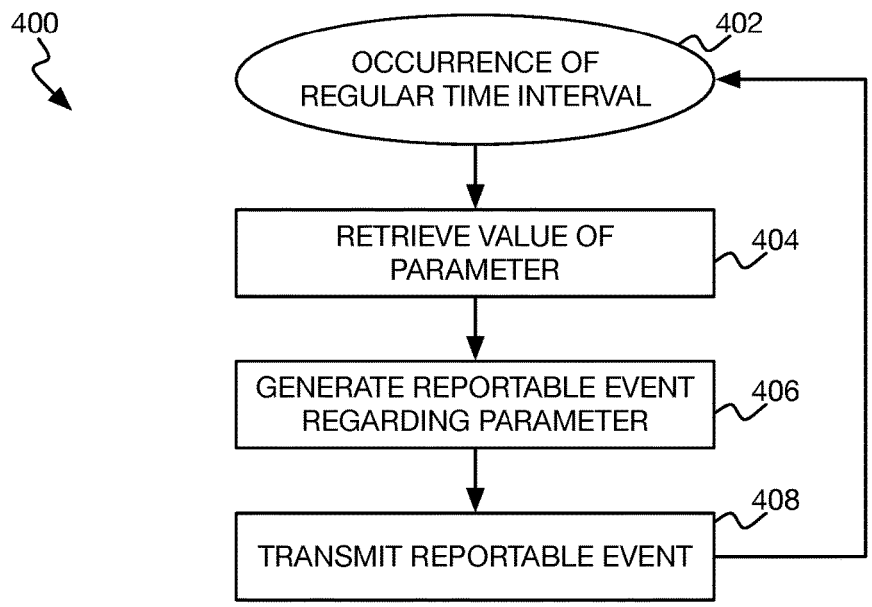
FIGS. 4A and 4B are flowcharts of example methods for autonomous transmission and autonomous generation of a reportable event consistent with FIG. 3, responsive to different types of conditions being satisfied.
Figure 4B:
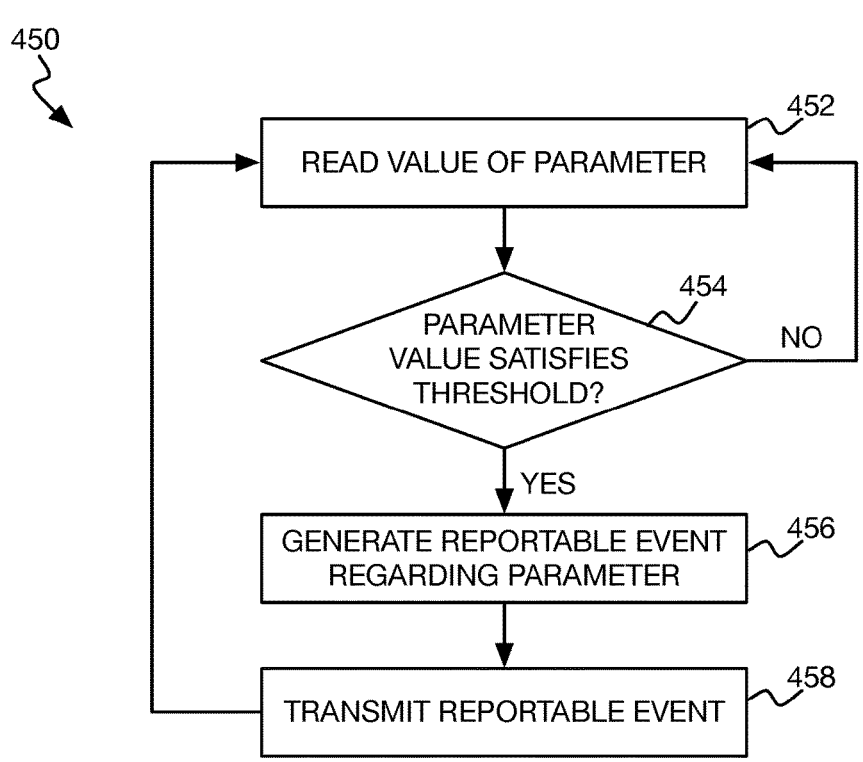

FIGS. 4A and 4B show example methods 400 and 450, respectively, of different types of conditions that can be satisfied to result in autonomous generation and transmission of reportable events concerning self-monitored parameters of the fabric-attachable storage drive 104. In FIG. 4A, the condition is that an interval timer has reached a prescribed interval specified during programming of the storage drive 104. By comparison, in FIG. 4B, the condition is that a value of a self-monitored parameter has satisfied a prescribed threshold specified during programming of the storage drive 104.

Referring first to FIG. 4A, the occurrence of a regular time interval occurs (402). For example, the fabric-attachable storage drive 104 may have instantiated a timer that counts down from an initial value and which results in an interrupt being generated within the storage drive 104 when the timer reaches a value of zero. The operating system 206 running on the storage drive 104 may receive this interrupt, and perform the remainder of the method 400 in response. As such, the storage drive 104 retrieves the current value of the self-monitored parameter at the occurrence of the regular time interval (404), generates the reportable event regarding the parameter (406), and transmits the reportable event to a location on the network fabric 102 (408). The method 400 then repeats at part 402, which can include resetting of the interval timer so that the regular time interval again occurs.

Referring to FIG. 4B, the fabric-attachable storage drive 104 can continually or periodically read the current value of the self-monitored parameter (452), and determine whether the value of the parameter that has just been read satisfies a threshold (454). The threshold may be a maximum allowable value of the parameter, a minimum allowable value of the parameter, or an allowable value range of the parameter. If the value of the parameter is greater than the maximum allowable value, less than the minimum allowable value, or outside the allowable value range, then the threshold has been satisfied. As such, the storage drive 104 generates the reportable event regarding the parameter (456), and transmits the reportable event to a location on the network fabric 102 (458). The method 450 can repeat at part 452, such that the current value of the self-monitored parameter is continually or periodically read and tested against the threshold until the parameter value again satisfies the threshold.

Figure 5:
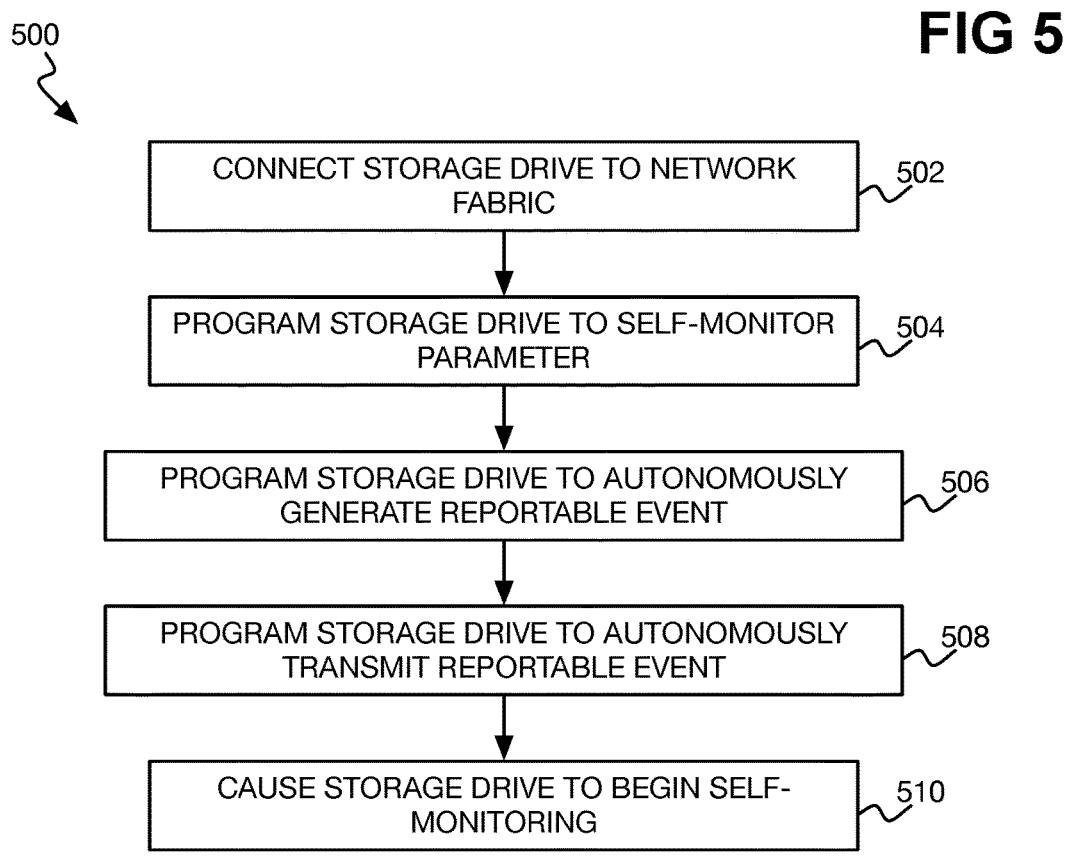
FIG. 5 is a flowchart of an example method performed in relation to a fabric-attachable storage drive to provide for autonomous transmission and autonomous generation of a reportable event.

FIG. 5 shows an example method 500 that an administrator or other user can perform in relation to a fabric-attachable storage drive 104 so that the storage drive 104 provides the functionality that has been described in relation to FIGS. 3, 4A, and 4B. The administrator can connect the storage drive 104 to a network fabric (502). The administrator then performs various programming of the storage drive 104. For example, the administrator may use a terminal device, such as a client computing device 106, to access a command-line interface (CLI) of the storage drive 104, if the drive 104 has already been programmed with autonomous reportable event transmission and generation functionality. In this case, the administrator may just have to specify the parameters to be self-monitored, the conditions that satisfaction thereof triggers the autonomous behavior regarding the parameters, and the locations to which the reportable events are to be transmitted. The administrator may also provide this information in a configuration file that is uploaded to the storage drive 104.

However, if the fabric-attachable storage drive 104 does not already have such autonomous reportable event transmission and generation functionality, then the administrator may program the storage drive 104 in a different manner. For example, the administrator may upload via the file transmission protocol (FTP) or in another manner a computer program that runs on the operating system 206 of the storage drive 104, or a patch to the operating system 206, which realizes the desired autonomous behavior. The program or patch may be bespoke and custom to the particular parameters, conditions, and locations that the administrator has planned for the storage drive 104 in question, or may be more general purpose. In the latter instance, after uploading such a program or patch, the administrator may then specify the parameters, conditions, and locations as described in the previous paragraph.

In either case, the administrator thus ultimately programs the fabric-attachable storage drive 104 to self-monitor a prescribed parameter (504), by at least specifying the parameter in question. The administrator programs the storage drive 104 to autonomously generate a reportable event responsive to a prescribed condition occurring (506), by at least specifying the condition that results in automatic generation of the reportable event. The administrator programs the storage drive 104 to autonomous transmit the generated reportable event to a prescribed location (508), by at least specifying the location on the network fabric 104 to which the drive 104 is to automatically transmit the reportable event.

The administrator finally causes the fabric-attachable storage drive 104 to begin self-monitoring of the parameter as programmed (510). If the autonomous functionality is provided by a computer program running on the operating system 206 of the storage drive 104, the administrator may start the program, for instance. If the functionality is instead directly provided by the operating system 206 itself, the administrator may change a configuration setting or change the value of a flag that corresponds to the storage drive 104 engaging in the autonomous behavior. Subsequently, when the programmed condition occurs, the drive 104 will therefore autonomously generate a reportable event regarding the self-monitored parameter, and autonomously transmit the reportable event to the specified location.

A special type of parameter for which a reportable event can be autonomously generated and transmitted by the fabric-attachable storage drive 104 pertains to the capabilities of the storage drive 104 and its availability to participate in a logical data storage topology with one or more other such fabric-attachable storage drives. Such periodic transmission of this information, and receipt of comparable information from the other storage drives, can result in the storage drives realizing that there is a sufficient number of them to self-organize as a storage drive group to achieve this topology. One storage drive may be responsible for initiating this self-organization, but once the group has been organized, the storage drives can interact as peers to respond to data access requests from client computing devices 106 for data stored according to the topology by the storage drives. In this way, for instance, the peer-to-peer RAID topology described in the previously referenced patent application having application Ser. No. 15/084,908 can be realized in an autonomous manner. Other logical data storage topologies that may be realizable in this manner include peer-to-peer data replication topologies, in which data stored on one storage drive is automatically replicated to other storage drives.

FIG. 6 shows an example such storage drive group 602. The storage drive group 602 is a self-organized logical data storage topology group, in that the constituent member fabric-attachable storage drives 604A, 604B, . . . , 604N, collectively referred to as the storage drives 604, have self-organized in a peer-to-peer manner to provide a particular logical data storage topology. Each storage drive 604 can be implemented as the fabric-attachable storage drive 104, and each can also provide the self-monitoring that has been described. The storage drives 604 are individually directed connected to the network fabric 102. Each storage drive 604 periodically broadcasts its capabilities and availability to participate in the logical data storage topology, and once a sufficient number of the storage drives 604 have been connected to the network fabric 102, the storage drives 604 can autonomously self-assemble as the group 602 to implement the logical data storage topology.

FIG. 7 shows an example method 700 by which such autonomous self-organization of fabric-attachable storage drives 604 within a group 602 to realize a logical data storage topology generally occurs. The method 700 is performed by each storage drive 604. A storage drive 604 periodically broadcasts on the network fabric 102 its capabilities and availability to participate within a logical data storage topology with other storage drives 604 (702). The capabilities of the storage drive 604 are parameters of the drive 604, and can include its capable internal and/or external data transfer rates, its total or available storage capacity, the type of physical storage the drive 604 employs for data storage, and so on. The availability of the storage drive 604 pertains to its availability to participate in a given logical data storage topology. For example, the storage drive 604 may have programming to participate in a mirror or replication topology, but not in a RAID-5 topology.

The fabric-attachable storage drive 604 listens for the capabilities and availabilities of other storage drives 604 similarly broadcasting on the network fabric 102, and thus receives the capabilities and availabilities of the other storage drives 604 (704). The storage drive 604 determines that the specified logical data storage topology can be realized when a sufficient number of other storage drives 604 with appropriate capabilities for the topology have broadcast their availability to participate in the topology (706). In one implementation, the storage drive 604 in relation to which the method 700 is being described alone makes this determination, and is responsible for initially organizing the drives 604 together as a group to realize the topology. In another implementation, each storage drive 604 that is available to participate in a particular topology can make this determination, and which drive 604 initially organizes the drives 604 together as a group can be selected randomly among the drives 604, in a round-robin manner, or in another manner.

A logical data storage topology results in the creation of a logical volume over the fabric-attachable storage drives 604 that will be participating in the group 602. Although the storage drives 604 each have individual physical storage media on which to store data, from the perspective of client computing devices accessing the data according to the topology, there is one logical data volume. Which storage drive(s) actually storage given requested data depends on the storage topology in question. For example, in a mirror topology, each storage drive 604 stores the data, and any drive 604 can respond to requests for the data. By comparison, in a RAID-5 topology, just one storage drive 604 may store the data, or each drive 604 may store a portion of requested data. Therefore, the determination made in part 706 is that there are sufficient available storage drives having the proper capabilities to create a logical volume according to the specified logical data storage topology.

The fabric-attachable storage drive 604 performing the method 700 thus interacts with these other storage drives 604 to create the logical volume according to the specified data storage topology (708). For example, the storage drive 604 performing the method, if responsible for initiating this interaction, may create a sparse volume and instruct each other storage drive 604 to also create a sparse volume. The sparse volumes may in concert realize the logical volume in question. The usage of sparse volumes on individual storage drives 604, which can be referred to as drive volumes, to implement such a logical volume is described in the previously referenced patent application having application Ser. No. 15/295,596. By the storage drives 604 directly communicating with one another, the drives 604 self-organize as the group 602 to implement the logical volume, which lacks a central management controller governing access to data stored on the logical volume according to the storage topology.

The fabric-attachable storage drive 604 likewise interacts with the other storage drives to respond to client requests to provide access to data stored on the logical volume (710). A given client computing device 106 may only interact with a particular storage drive 604 to access data of the logical volume, for instance, for load-balancing purposes. This is particularly well suited for a replication or mirroring topology, in which any storage drive 604 can field read requests for data of the logical volume, because each drive 604 maintains all the data of the volume. By comparison, write requests can be satisfied by a storage drive 604 provisionally writing the requested data to a volume, and then sending the requested data to each other storage drive 604 replicating or mirroring the volume, before the drives 604 collectively decide to commit the write.

As another example, each fabric-attachable storage drive 604 of the storage drive group 602 may participate to field a data request received from a client computing device 106. For example, if the logical storage topology is RAID-5 redundancy, each storage drive 604 may store a portion of the requested data. The storage drive 604 that initial fields the request sends its portion of the data to another storage drive 604 within the group 602, which adds its portion to the received data portion before sending it to a third drive 604 within the group 602. The last drive 604 that receives the data portion adds the portion of the data that it stores before responding to the client device 106 that made the request. This process is described in detail in the referenced patent application having application Ser. No. 15/084,908.

The autonomous self-organization of fabric-attachable storage drives 604 within a storage drive group 602 to provide a logical data storage topology is thus a special case of the autonomous generation and transmission of reportable data events of self-monitored parameters. The parameters that each storage drive 604 self-monitors in this respect are its capabilities, and its availability to participate in a group 602 to realize a logical data storage topology. The condition by which the reportable data event is autonomously generated is the occurrence of regular time intervals combined a storage drive 604 indeed being available to participate in a group 602 to realize a particular topology. The autonomous transmission of the reportable data event is the broadcasting of this information on the network fabric 102 for receipt by other storage drives 604.

More generally, the techniques that have been disclosed herein therefore provide for improved monitoring of fabric-attachable storage drives without polling of the drives. Because the storage drives can be directly attached to a network fabric, the drives provide access to data stored on their physical storage media without intervention by a storage controller that would otherwise be privy to at least some monitoring information as the data on the drives is accessed. Therefore, according to the techniques described herein, the storage drives instead autonomously generate and autonomously transmit reportable events to prespecified locations on the network fabric, out of band from providing access to data stored on their physical storage responsive to access requests.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage drives. It is manifestly intended that this invention be limited only by the claims and equivalents thereof.

We claim:

1. A method comprising:
   connecting a fabric-attachable storage drive to a network fabric;
   programming the fabric-attachable storage drive to self-monitor a parameter of the fabric-attachable storage drive;
   programming the fabric-attachable storage drive to autonomously generate a reportable event regarding the self-monitored parameter responsive to a condition occurring;
   programming the fabric-attachable storage drive to autonomously transmit the autonomously generated reportable event to a specified location on the network fabric; and
   architecting the fabric-attachable storage drive to start self-monitoring of the parameter as programmed, the fabric-attachable storage drive autonomously generating the reportable event after the condition occurs and autonomously transmitting the reportable event over the network fabric to the specified location after the reportable event is autonomously generated,
   wherein the condition is chosen from:
     an interval timer reaching a prescribed interval, the fabric-attachable storage drive autonomously generating the reportable event and autonomously transmitting the reportable event that has been generated to the specified location at every occurrence of the prescribed interval; and
     a value of the self-monitored parameter satisfying a threshold, the fabric-attachable storage drive autonomously generating the reportable event and autonomously transmitting the reportable event that has been generated to the specified location every time the value of the self-monitored parameter satisfies the threshold.

2. The method of claim 1, wherein the parameter comprises one or more of:
   an environmental parameter measured by a sensor of the fabric-attachable storage drive;
   a first external performance parameter regarding an external data transfer rate at which the fabric-attachable storage drive is responding to access requests regarding data stored on a physical storage of the fabric-attachable storage drive over the network fabric;
   a second external performance parameter regarding a number of the access requests received by the fabric-attachable storage drive regarding the data stored on the physical storage of the fabric-attachable storage drive;
   an internal performance parameter regarding an internal data transfer rate at which the fabric-attachable storage drive is accessing the data stored on the physical storage of the fabric-attachable storage drive;
   a capacity usage parameter regarding an available or used capacity of storage capacity of the physical storage of the fabric-attachable storage drive.

3. The method of claim 1, wherein programming the fabric-attachable storage drive to autonomously transmit the autonomously generated reportable event comprises:
   programming the fabric-attachable storage drive to autonomously transmit the autonomously generated reportable event to each of more than one specified location on the network fabric.

4. The method of claim 1, wherein the fabric-attachable storage drive is one of:
   a programmable non-volatile memory Express (NVMe) storage drive that exports access thereto over an NVMe-over-fabric storage protocol and that has a controller running an operating system to perform the self-monitoring of the parameter, autonomous generation of the reportable event, and transmission of the reportable event;
   a programmable storage drive that lacks an external interface by which to connect to a host computing device storage bus, that has a network interface connected to the network fabric, and that has a processor and a memory storing computer-executable code, the processor running the operating system by executing the code to perform the self-monitoring of the parameter, autonomous generation of the reportable event, and transmission of the reportable event.

5. The method of claim 1, wherein the fabric-attachable storage drive provides access to data stored on a physical non-volatile storage of the fabric-attachable storage drive responsive to access requests by client devices connected to the network fabric,
   and wherein the fabric-attachable storage drive autonomously generates the reportable event and autonomously transmits the reportable event to the specified location on the network fabric out of band from providing access to the data responsive to the access requests.

6. A fabric-attachable storage drive comprising:
   a network fabric adapter to physically connect the fabric-attachable storage drive to a network fabric;
   a non-volatile storage to store data accessible over the network fabric; and
   control hardware to run an operating system to:
     self-monitor a prespecified parameter of the fabric-attachable storage drive;
     detect satisfaction of a prescribed condition; and
     responsive to detecting satisfaction of the prespecified condition, autonomously generate a reportable event regarding the self-monitored prespecified parameter, and autonomously transmit the reportable event to a prespecified location on the network fabric,
   wherein the prespecified condition is chosen from:
     an interval timer reaching a prescribed interval, wherein the control hardware is to detect satisfaction of the prescribed condition by determining that the interval timer has reached the prescribed interval, and responsive to determining that the interval timer has reached the prescribed interval, resetting the interval timer, and wherein the control hardware is to generate the reportable event and autonomously transmit the reportable event that has been generated to the prespecified location at every occurrence of the prescribed interval; and a value of the self-monitored parameter satisfying a threshold, wherein the control hardware is to detect satisfaction of the prescribed condition by determining that a value of the self-monitored prespecified parameter has satisfied a threshold, and wherein the control hardware is to generate the reportable event and autonomously transmit the reportable event that has been generated to the prespecified location every time the value of the self-monitored prespecified parameter satisfies the threshold.

7. The fabric-attachable storage drive of claim 6, wherein the prespecified parameter comprises one or more of:
an environmental parameter measured by a sensor of the fabric-attachable storage drive;
a first external performance parameter regarding an external data transfer rate at which the fabric-attachable storage drive is responding to access requests regarding the data stored on the non-volatile storage of the fabric-attachable storage drive over the network fabric;
a second external performance parameter regarding a number of the access requests received by the fabric-attachable storage drive regarding the data stored on the non-volatile storage of the fabric-attachable storage drive;
an internal performance parameter regarding an internal data transfer rate at which the fabric-attachable storage drive is accessing the data stored on the non-volatile storage of the fabric-attachable storage drive;
a capacity usage parameter regarding an available or used capacity of storage capacity of the non-volatile storage of the fabric-attachable storage drive.

8. The fabric-attachable storage drive of claim 6, wherein the prespecified parameter is a first prespecified parameter, the prescribed condition is a first prescribed condition, the reportable event is a first reportable event, and the prespecified location is a first prespecified location, and wherein the control hardware runs the operating system to further:
self-monitor a second prespecified parameter of the fabric-attachable storage drive;
detect satisfaction of a second prescribed condition; and
response to detecting satisfaction of the second prescribed condition, autonomously generate a second reportable event regarding the second self-monitor prespecified parameter, and autonomously transmit the second reportable event to a second prespecified location on the network fabric different than the first prespecified location.

9. The fabric-attachable storage drive of claim 6, wherein the fabric-attachable storage drive is a programmable non-volatile memory (NVMe) storage drive,
wherein the control hardware comprises a discrete controller exporting access to the programmable NVMe storage drive over an NVMe-over-fabric storage protocol,
and wherein the non-volatile storage is a solid-state storage.

10. The fabric-attachable storage drive of claim 6, wherein the fabric-attachable storage drive is a programmable storage drive lacking an external interface by which to connect to a host computing device storage bus,
wherein the network fabric adapter is a network interface;
wherein the control hardware comprises:
a processor;
a memory storing computer-executable code, the processor to execute the computer-executable code to run the storage drive.

11. The fabric-attachable storage drive of claim 6, wherein the control hardware is provide access to the data stored on the non-volatile storage responsive to access requests by client devices connected to the network fabric,
and wherein the control hardware is to autonomously generate the reportable event and is to autonomously transmit the reportable event to the prespecified location on the network fabric out of band from providing access to the data responsive to the access requests.

12. A computer-readable data storage medium that is not a transitory signal storing computer-executable code that a fabric-attachable storage drive executes to:
broadcast capabilities and availability of the fabric-attachable storage drive over a network fabric to which the fabric-attachable storage drive is connected;
receive capabilities and availabilities of other fabric-attachable storage drives broadcast over the network fabric;
in response to determining that the capabilities of one or more selected fabric-attachable storage drives that are available are sufficient to create a logical volume thereover according to a specified logical data storage topology,
interact with the selected fabric-attachable storage drives to create the logical volume according to the specified logical data storage topology on a storage device group including the fabric-attachable storage drive and the selected fabric-attachable storage drives;
self-monitor a prespecified parameter of the fabric-attachable storage drive; and
responsive to satisfaction of a prespecified condition, autonomously generate a reportable event regarding the self-monitored prespecified parameter, and autonomously transmit the reportable event to a prespecified location on the network fabric,
wherein the logical volume lacks a central management controller, and the storage drive group self-organizes in a peer-to-peer manner to create the logical volume,
and wherein the condition is chosen from:
an interval timer reaching a prescribed interval, the fabric-attachable storage drive autonomously generating the reportable event and autonomously transmitting the reportable event that has been generated to the specified location at every occurrence of the prescribed interval; and
a value of the self-monitored parameter satisfying a threshold, the fabric-attachable storage drive autonomously generating the reportable event and autonomously transmitting the reportable event that has been generated to the specified location every time the value of the self-monitored parameter satisfies the threshold.

13. The computer-readable data storage medium of claim 12, wherein the fabric-attachable storage drive executes the computer-executable code to further:
interact with the selected fabric-attachable storage drives to respond to requests by client devices connected to the network fabric to provide access to data of the logical volume of the storage drive group.

14. The computer-readable data storage medium of claim 12, wherein the specified logical data storage topology is one of:
a redundant-array of independent disks (RAID) topology;
a data replication topology.

15. The computer-readable data storage medium of claim 12, wherein the fabric-attachable storage drive is one of:

a programmable non-volatile memory Express (NVMe) storage drive that exports access thereto over an NVMe-over-fabric storage protocol and that has a controller running an operating system to perform the self-monitoring of the parameter, autonomous generation of the reportable event, and transmission of the reportable event;

a programmable storage drive that lacks an external interface by which to connect to a host computing device storage bus, that has a network interface connected to the network fabric, and that has a processor and a memory storing computer-executable code, the processor running the operating system by executing the code to perform the self-monitoring of the parameter, autonomous generation of the reportable event, and transmission of the reportable event.

* * * * *